(12) United States Patent
Korthals

(10) Patent No.: US 6,935,106 B2
(45) Date of Patent: Aug. 30, 2005

(54) NEUTRAL START MECHANISM FOR A HYDROSTATIC TRANSMISSION

(75) Inventor: Douglas Dean Korthals, Fuquay-Varina, NC (US)

(73) Assignee: Deere & Company, Moline, IL (US)

( * ) Notice: Subject to any disclaimer, the term of this patent is extended or adjusted under 35 U.S.C. 154(b) by 173 days.

(21) Appl. No.: 10/651,014

(22) Filed: Aug. 26, 2003

(65) Prior Publication Data

US 2005/0044850 A1 Mar. 3, 2005

(51) Int. Cl.⁷ .............................................. F16D 31/02
(52) U.S. Cl. ........................................ 60/399; 60/487
(58) Field of Search .................... 60/399, 328, 387, 60/487; 92/12.2

(56) References Cited

U.S. PATENT DOCUMENTS

| | | |
|---|---|---|
| 4,211,079 A | 7/1980 | Saele et al. |
| 4,496,035 A | 1/1985 | Wanie |
| 4,531,365 A | 7/1985 | Wanie |
| 5,383,376 A | 1/1995 | Thorman et al. |
| 5,427,216 A | 6/1995 | Hoch |
| 5,586,955 A | 12/1996 | Wanie |
| 5,809,756 A | 9/1998 | Scag et al. |
| 6,378,300 B1 * | 4/2002 | Johnson et al. ............... 60/399 |
| 6,487,857 B1 | 12/2002 | Poplawski et al. |
| 6,490,849 B1 | 12/2002 | Scag et al. |

* cited by examiner

Primary Examiner—Edward K. Look
Assistant Examiner—Michael Leslie
(74) Attorney, Agent, or Firm—The Law Office of Randall T. Erickson, P.C.

(57) ABSTRACT

A neutral start switch arrangement is provided for a work vehicle having a motor driving a hydrostatic pump, the hydrostatic pump driving a hydraulic motor which drives a wheel. The hydrostatic pump typically has an input control shaft, the rotation of which moves the hydrostatic pump from the neutral position to the forward or reverse drive position. A selectively rotatable control arm is fixed to the input control shaft. A first arm is mounted for rotation about the input control shaft axis. A second arm is mounted for rotation about the input control shaft axis. The control arm and the first and second arms are configured for the control arm to be rotated from a neutral drive position to rotate the first arm in a forward drive rotary direction or the second arm in a second rotary direction corresponding to the reverse drive. A first leg extends from the first arm and a second leg extends from the second arm, and a spring is stretched between the first and second legs. The spring rotationally biases the first arm and the second arm toward each other and both into the neutral position. A neutral start switch is mounted to the first arm to orbit about the input control shaft axis with rotation of the control arm. The switch has a push button actuation portion that is arranged to be actuated by contact with the second arm to change switch states when the control arm is moved into the neutral position.

14 Claims, 4 Drawing Sheets

NEUTRAL START MECHANISM FOR A HYDROSTATIC TRANSMISSION

TECHNICAL FIELD OF THE INVENTION

This device relates to neutral start mechanisms usable with hydrostatic transmissions. Particularly, the invention relates to neutral start switches used in vehicles driven via hydrostatic motors.

BACKGROUND OF THE INVENTION

It is known to provide vehicles with motors or engines that drive hydrostatic transmissions wherein vehicle speed and direction are controlled by the hydrostatic transmission. A typical hydrostatic transmission has an input control shaft which is pivoted in a first rotary direction to propel the vehicle forward, and which is pivoted in an opposite rotary direction for driving the vehicle in the reverse direction. The input control shaft is typically operatively connected to a swashplate in the hydrostatic pump of the transmission. The input control shaft and the swashplate have a forward drive pivot direction, an opposite reverse drive pivot direction, and a neutral position between the forward drive and reverse drive pivot directions.

Vehicles with hydrostatic transmissions include a control mechanism or linkage structure operatively connected to the input control shaft for allowing an operator of the vehicle to control the operation of the transmission. These control linkages typically include a hand lever or foot pedals engagable by the operator during vehicle travel. These linkages typically include a neutral return feature which pivots the input control shaft and the swashplate back to the neutral position when the operator releases the hand lever or foot pedal.

It is also known to provide a "neutral start mechanism" on vehicles having hydrostatic transmissions. Such neutral start mechanisms are described for example in U.S. Pat. Nos. 5,586,955 and 4,531,365. Neutral start mechanisms prevent the vehicle power source or engine from being started while the transmission is in a driving, non-neutral mode, and thereby generally prevent the vehicle from lunging forward when started. Conventional neutral start mechanisms tend to add complexity to the overall linkage structure and contribute to a relatively high overall part count for the linkage structure.

Conventional neutral start mechanisms are typically costly to manufacture and assemble, space consuming and complex. Conventional neutral start mechanisms typically utilize mechanical slides and/or rollers, all requiring various forms of adjustment and regular maintenance.

The present inventor has recognized that it would be desirable to provide the neutral return feature for a hydrostatic transmission with an improved neutral start feature which prevents the operator from starting the vehicle when the transmission is in any mode other than its neural mode. The present inventor has recognized that it would be desirable for such a neutral start feature to be relatively simple in construction, having relatively few parts, and having a relatively low cost of manufacture and assembly.

SUMMARY OF THE INVENTION

The invention provides an improved neutral start switch arrangement for a work vehicle having a motor or engine that drives a hydrostatic pump, the hydrostatic pump driving a hydraulic motor. The hydrostatic motor typically drives one or more wheels of the vehicle. The hydrostatic pump typically has an input control shaft, the rotation of which moves the hydrostatic pump from the neutral position to the forward drive position or reverse drive position. A control arm is fixed to the input control shaft, and a linkage element is fixed at one end portion to the control arm at a distance from an axis of rotation of the input control shaft. The linkage element extends to an opposite end portion where it is engagable to be moved to selectively rotate the input control shaft via the control arm. A first arm is mounted for rotation about the input control shaft axis and extends a radial distance from the input control shaft. A neutral start switch is mounted to the first arm to orbit about the input control shaft axis with rotation of the control arm. The switch has an actuation portion that is arranged to be actuated to change switch states when the control arm is in the neutral position.

The switch actuation portion can be a momentary switch that changes state when released. The switch actuation portion can comprise a contact switch such as a push button switch. Alternately, the switch can be a switch that is actuated by a contact-less feature such as by a magnetic or optical arrangement.

The switch can be mounted to the first arm by a slotted attachment that can be loosened and adjusted to set a position of the switch with respect to the first arm.

The second arm can be mounted for rotation about the input control shaft axis and can extend a radial distance from the input control shaft axis. The control arm and the first arm can be configured for the control arm to be rotated from a neutral drive position in a first rotary direction to rotate the first arm in the first rotary direction corresponding to either forward or reverse drive while the second arm is stationary. The control arm and the second arm are configured for the control arm to be rotated from a neutral drive position in a second rotary direction to rotate the second arm in the second rotary direction corresponding to the respective other of forward or reverse drive while the first arm is stationary. The actuation portion can then be actuated by being in close proximity to, in the case of a contact-less switch arrangement, or by being in contact with, the second arm when the control arm is in the neutral position.

Preferably, a first leg extends from the first arm and a second leg extends from the second arm, and a spring is stretched between the first and second legs. By urging the legs together, the spring rotationally biases the first arm and the second arm toward each other.

At least one abutment that is stationary with respect to the pump casing can be interposed between the first and second arms. The abutment prevents the first arm from rotating in the second rotational direction past the neutral position, and preventing the second arm from rotating in the first rotational direction past the neutral position.

According to an exemplary embodiment, the hydraulic transmission is powered by a motor or engine that provides motive power to the work vehicle. An operator control mechanism is movable by the operator to select neutral, forward or reverse drive. The control mechanism is operatively connected to the control arm which is fixed to the input control shaft for rotation therewith. A linkage has a base portion connected to the control arm at a position displaced from the axis and a distal portion arranged to be displaced by selective movement of the operator control mechanism. The neutral start switch is actuated by being in close proximity to, or in contact with, an actuating surface, the actuating surface held stationary with respect to the casing and the neutral start switch mounted to orbit about the axis of the input control shaft with rotation of the control arm. The neutral start switch is actuated by the actuating surface to change states when the control arm is rotated into the neutral position. The neutral start switch is released from the actuating surface when the control arm is rotated out of the neutral position. The neutral start switch is incorporated into a circuit which prevents starting of the engine when the neutral start switch moves out of close proximity to the actuating surface.

Preferably, the neutral start switch includes a switch button that changes state when it is depressed by the actuating surface and changes state when it is released from the actuating surface.

The invention provides sensing when the vehicle transmission is located exactly in neutral, allowing for the safe starting, operation and setting of the vehicle parking brake. The types of vehicles that can benefit from incorporating the invention include, but are not limited to, commercial walk-behind, stand-on and sit-on, rotary and reel mowers.

According to the invention, a neutral start switch and supporting structure is provided that requires fewer components to achieve the requirement of sensing when the drive system is in neutral. Additionally, the time to assemble the various components to a vehicle to achieve neutral position sensing is significantly less than the current procedure. An additional benefit of the invention is that required field maintenance is substantially reduced with improved reliability. By providing a simplified assembly with reduced parts, a significant cost reduction, and an enhanced reliability can be achieved.

Numerous other advantages and features of the present invention will become readily apparent from the following detailed description of the invention and the embodiments thereof, from the claims and from the accompanying drawings.

DETAILED DESCRIPTION OF THE PREFERRED EMBODIMENTS

Figure 1:
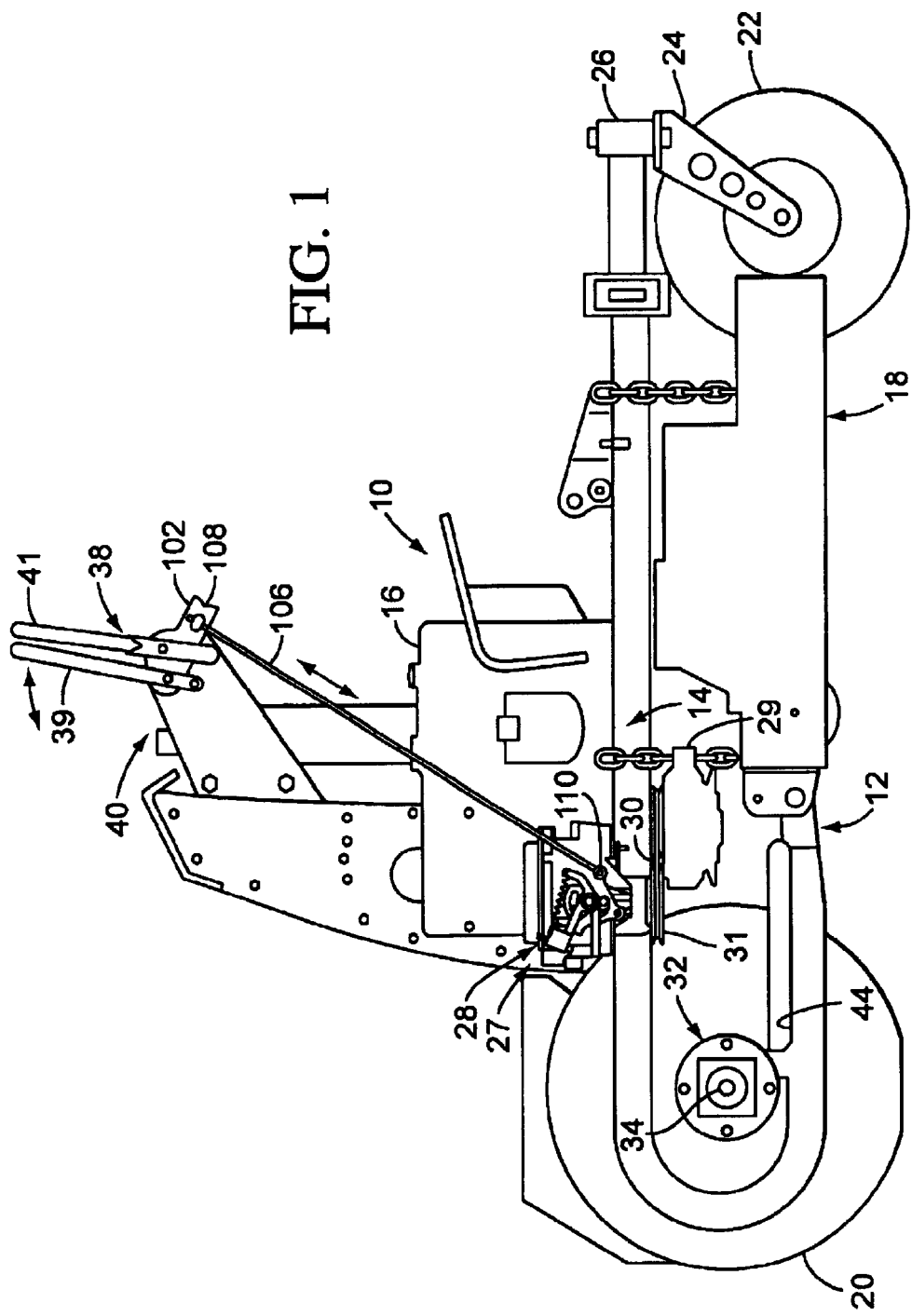
FIG. 1 is a schematic cross sectional view of a stand-on mower that incorporates the present invention.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

FIG. 1 illustrates a stand-on lawnmower 10 incorporating the preferred embodiment of the present invention. Stand-on lawnmowers of this type are described for example in U.S. Pat. Nos. 5,809,756 and 6,490,849, herein incorporated by reference, and also commercially available as QUIK-TRAK mowers from Deere and Company, USA. Although a stand-on lawnmower is illustrated and described herein, the invention is applicable to other vehicles and machines as well, including walk-behind and sit-on lawnmowers.

The lawnmower 10 includes a frame 12. The frame 12 includes an engine mount portion 14 to which a prime mover 16, such as an electric motor or an internal combustion engine, is mounted. A cutting deck 18 is mounted beneath and in front of the engine mount portion 14.

The lawnmower 10 includes at least one rear wheel 20 and at least one front wheel 22, preferably two rear wheels and two front wheels are provided. The two front wheels 22 are mounted by means of a bracket 24 and a swivel 26 to the front of the frame 12, acting as caster wheels. The two rear wheels 20 are selectively driven by the prime mover 16 via a mechanism 27 for transmitting the rotational power from the prime mover 16 to the rear wheels 20.

According to the illustrated embodiment, the lawnmower is provided with two hydraulic pumps 28 (only one shown) driven by the engine 16 by means of a belt 30 and corresponding pulleys 29, 31 respectively fixed onto the vertical output shaft of the engine 16 and onto a vertical input shaft (not shown) of the pump 28. The hydraulic pump 28 may be model BDP-10A commercially available from Hydro Gear Limited Partnership of Sullivan, Ill., USA. Two hydraulic motors 32 (only one shown) are positioned on the frame 12 by being bolted thereto. The wheels 20 are each mounted to a driving axle 34 of a respective hydraulic motor 32 so that the axles 34 rotate the wheels 20. Each hydraulic motor 32 is in fluid communication with its respective pump 28 by means of hoses (not shown). The amount and direction of flow of hydraulic fluid between each respective pump 28 and its hydraulic motor 32 is controlled by operator controls 38, mounted to a rear portion 40 of the frame 12.

The operator controls 38 can include a pair of control levers 39 (only one shown), one for each respective pump 28 and corresponding hydraulic motor 32. The levers are spring loaded to return to a position corresponding to neutral when released. Pushing both levers 39 forward causes the mower to move forward. Pulling both levers 39 to the rear causes the mower to move backward. Pushing one lever forward while pulling the other lever to the rear, or not pushing the other lever as far forward, causes the mower to turn. If the one lever is forward and the other to the rear to the same extent, each will rotate the same speed, but in opposite directions, and the mower 10 will rotate about a center point between the two wheels. When both levers 39 are released, the wheels stop rotating due to dynamic braking, and the mower travel comes to a stop nearly instantly. A stationary bar 41 is fixed into the frame 12 so as to be positioned forward of the levers 39, to provide a stable and fixed frame of reference for enhanced control of the levers.

A platform 44 is provided by the frame 12, located between the rear wheels 20. The platform 44 is formed of sufficient materials, and is sufficiently sturdy, to support the weight of an operator standing on the platform.

Each control lever 39 is rigidly connected to a respective crank arm 102; both parts 39, 102 being pivotally connected to the upper portion 40 of the frame 12. One of two control rods 106 (only one shown) is pivotally connected to an end 108 of each crank arm 102 such that pivoting of the respective lever 39 shifts the respective control rod 106 along a lengthwise direction of the control rod. Each control rod 106 is pivotally connected at an opposite end 110 to the respective hydraulic pump 28, particularly to a linkage assembly 112 that is carried on a pump casing 113 of the pump 28.

Figure 2:
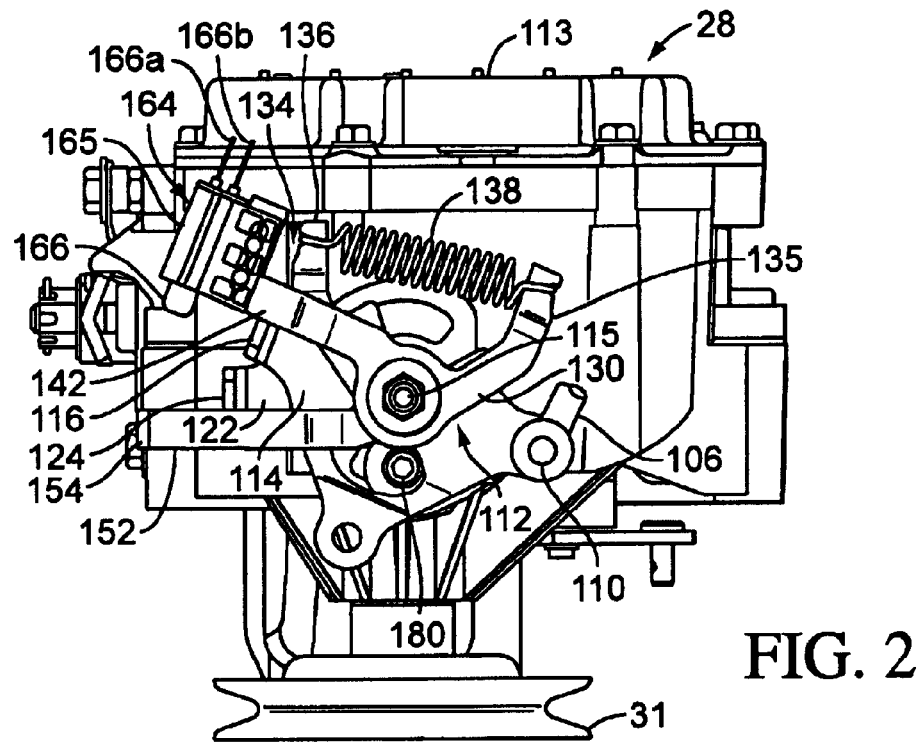
FIG. 2 is an enlarged elevational view of a hydrostatic pump taken from FIG. 1, shown in a forward drive position.

The linkage assembly 112 is shown in FIGS. 2–6. The linkage is also explained in detail in U.S. Pat. No. 6,487,857, herein incorporated by reference. As shown in FIG. 2, the control rod 106 is connected to a control arm 114. The control arm 114 is operatively connected to an internal swash plate (not shown) of the hydrostatic pump 28 via an input control shaft 115 such that the direction of rotation of the control arm 114, and the resulting tilting of the swashplate, dictates the direction of hydraulic fluid flow to the hydrostatic motor 32, and the degree of rotation of the control arm 114, and the degree of tilting of the swashplate, dictates the amount of hydraulic fluid flow and thus the rotational speed of the hydrostatic motor 32 and wheel 20.

Figure 6:
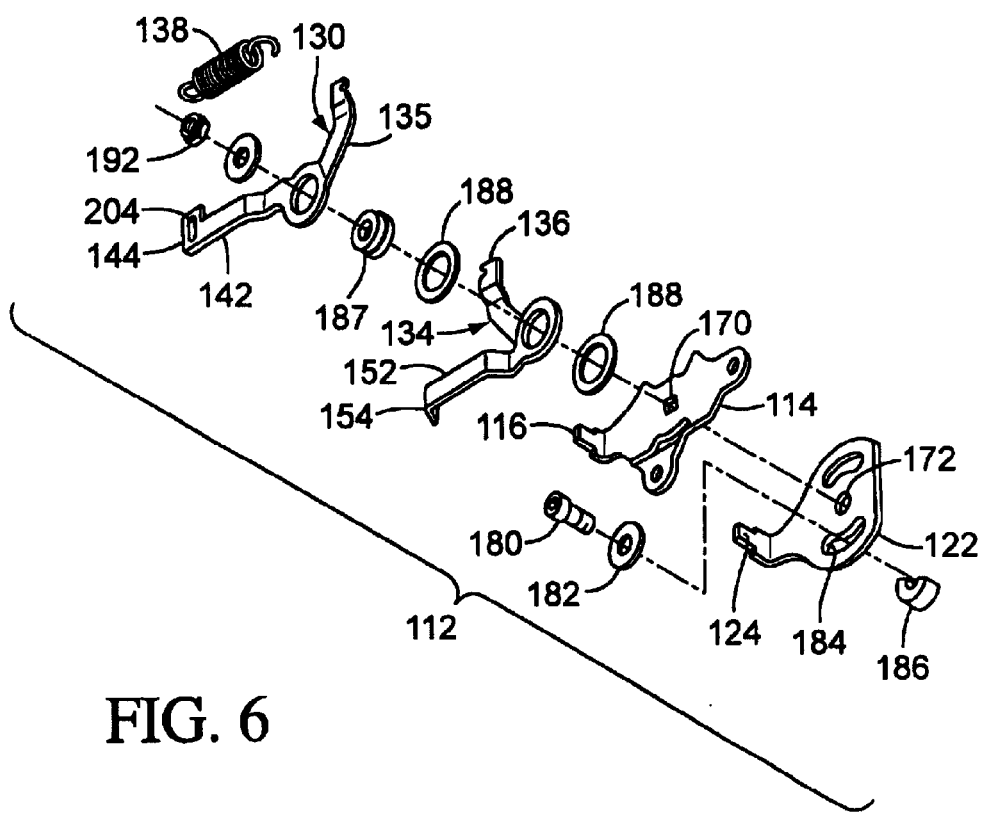
FIG. 6 is an exploded perspective view of linkage parts taken from FIG. 2.

As illustrated best in FIG. 6, the control arm 114 includes a finger portion 116 that protrudes parallel to an axis of rotation of the control arm 114.

The control assembly 112 also includes a stationary plate 122 that is fixedly mounted to the pump casing 113 to be stationary therewith. As illustrated best in FIG. 6, the stationary plate 122 includes a finger portion 124 that protrudes in a direction that is parallel to the axis of rotation of the control arm 114.

The assembly 112 further includes a first arm plate 130 and a second arm plate 134. A tension spring 138 is stretched between legs 135, 136 of the respective arm plates 130, 134.

As illustrated best in FIG. 6, the first arm plate 130 includes an elongated first arm 142 having a mounting end 144. The second arm plate 134 includes an elongated second arm 152 having a bent end 154. A switch 164 (FIG. 2) is carried by the mounting end 144. The switch 164 includes a switch housing 165 and an actuation portion. The actuation portion can be a contact switch element such as a switch push button 166 that extends toward the bent end 154 of the second arm 152. The switch push button 166 includes an internal spring (not shown) which urges the switch push button 166 outwardly (downward) of the switch housing 165. The switch 164 is configured such that the button 166 extending outwardly represents one switch state (making or breaking contact) and the button retracted toward the switch housing represents an opposite switch state (making or breaking contact). The switch is a momentary switch that changes switch states when moved from an extended position to a retracted position and vice versa.

Figure 3:
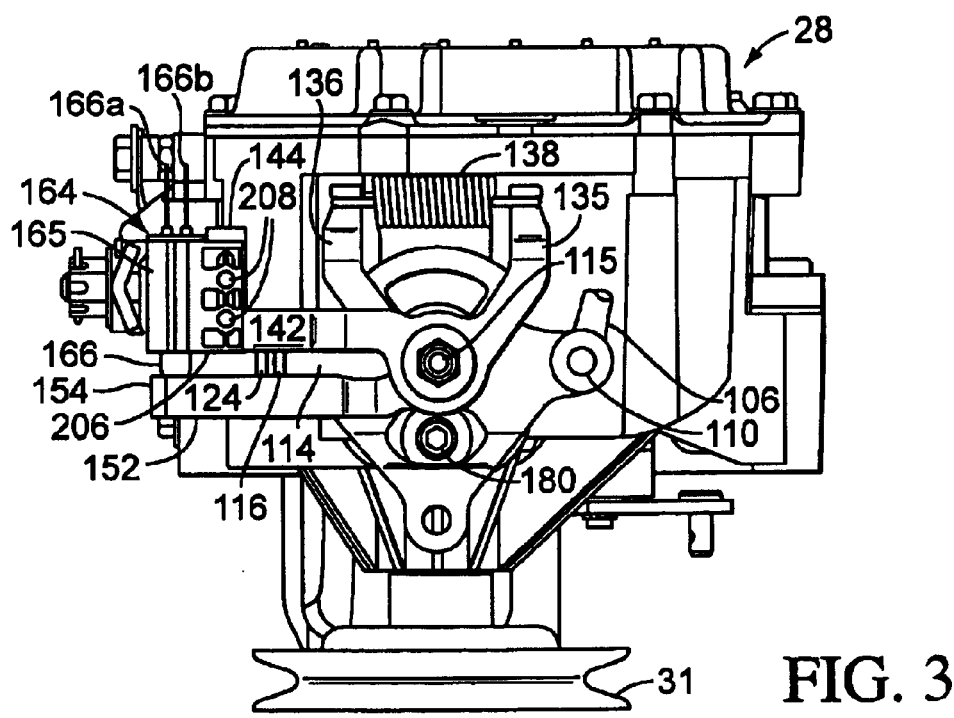
FIG. 3 is an enlarged elevational view of a hydrostatic pump taken from FIG. 1, shown in a neutral drive position.

The control circuitry (not shown) that is connected to the starting motor of the vehicle is signal-connected by wires (not shown) to leads 166a, 166b of the switch 164 and is configured such that the vehicle can only be started when the switch state corresponds to the button 166 being retracted or pressed toward the switch housing 165, as shown in FIG. 3. The control circuitry can also be configured such that forward or reverse drive cannot be actuated when the parking brake is activated. If the switch state changes from the neutral state shown in FIG. 3, and the parking brake switch indicates the parking brake is activated, the circuitry turns off the engine. Other control schemes that have as an input the neutral position, or the non-neutral position of the hydrostatic pump, can incorporate the invention.

As illustrated best in FIG. 6, the parts 130, 134, 114 and 122 each have a central hole that aligns along an axis of rotation of the control arm 114. The hydraulic pump input control shaft 115 extends along the axis of rotation of the control arm 114. The elements 130, 134 are rotationally mounted with respect to the input control shaft 115, the element 114 has a noncircular central hole 170 that receives a corresponding noncircular portion (not shown) on the input control shaft 115 such that the input control shaft and the control arm 114 are fixed to rotate together. The linkage assembly 112 also includes a spacer 187 and wear resistant washers 188 to provide for assembly and a smooth operation.

The stationary plate 122 is fixed to the pump casing 113 and the input control shaft 115 is permitted to rotate within a central aperture 172 of stationary plate 122. The stationary plate 122 is adjustably fixed to the pump casing 113 using a fastener 180, and a washer 182. The fastener head and the washer are located on an outer surface of the stationary plate 122. The fastener shaft penetrates through a curved slot 184 formed through the stationary plate 122. A spacer 186 is located between the stationary plate 122 and the pump casing 113 and receives the fastener shaft. The fastener is threaded into a threaded bore (not shown) of the pump casing 113. To reposition the rotational position of the finger portion 124 with respect to the axis of rotation of the control arm 114, the fastener 180 is loosened and the stationary plate 122 can be rotated to a select position, and the fastener 180 can then be re-tightened.

A nut 192 and a washer 194 are engaged to a distal end of the input control shaft 115 to integrate the assembly 112.

In FIG. 2, for forward operation, the control rod 106 has been displaced downwardly. The control arm 114 has been rotated slightly clockwise to rotate the input control shaft 115 clockwise. The finger portion 116 of the control arm has displaced the first arm plate 130, lifting the button 166 from contact with the bent end 154 of the second arm 152 of the second arm plate 134. The switch 164 thus changes state, either from open to closed, or vice versa, depending on the circuit design. The spring 138 is stretched, i.e., the force from the control rod 106 must overcome this spring tension. The second arm plate 134 is prevented from rotating with the first arm plate 130 by contact from the finger portion 124 of the stationary plate 122 fixed in place on the pump casing 113.

FIG. 3 illustrates the hydraulic pump of FIG. 2 wherein force has been removed from the lever 39 and the control rod 106 is permitted to elevate under force from the spring 138. The first arm plate 130 is rotated counterclockwise by the spring 138 returning to its original length, and the first arm 142 pushes the finger portion 116 downward, rotating the control arm 114 counterclockwise until the first arm 142 contacts the finger portion 124 of the stationary plate 122.

Figure 5:
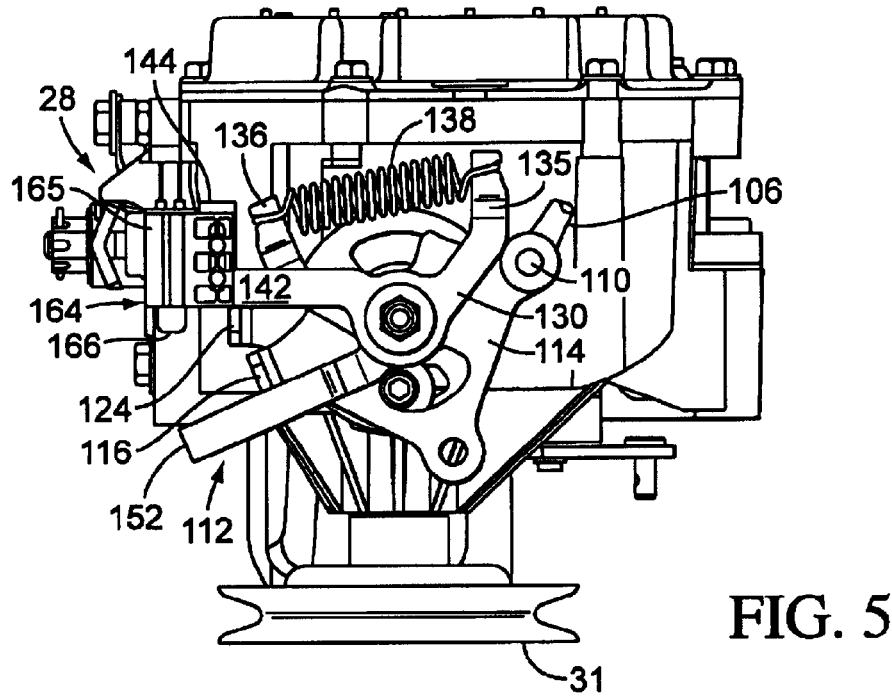
FIG. 5 is an enlarged elevational view of a hydrostatic pump taken from FIG. 1, shown in a reverse drive position.

FIG. 5 illustrates the hydrostatic pump 28 in a reverse drive position. The lever 39 has been pulled in a reverse direction causing the control rod 106 to be displaced upwardly. The control arm 114 is thus rotated counterclockwise. The spring 138 is stretched and the finger portion 116 of the control arm 114 displaces the second arm 152 of the second arm plate 134 downward, in a counterclockwise direction. The switch button 166 is again allowed to expand which changes the state of the switch 164, as described above. The first arm plate 130 is prevented from rotating counterclockwise by the finger portion 124 of the stationary plate 122.

Figure 4:
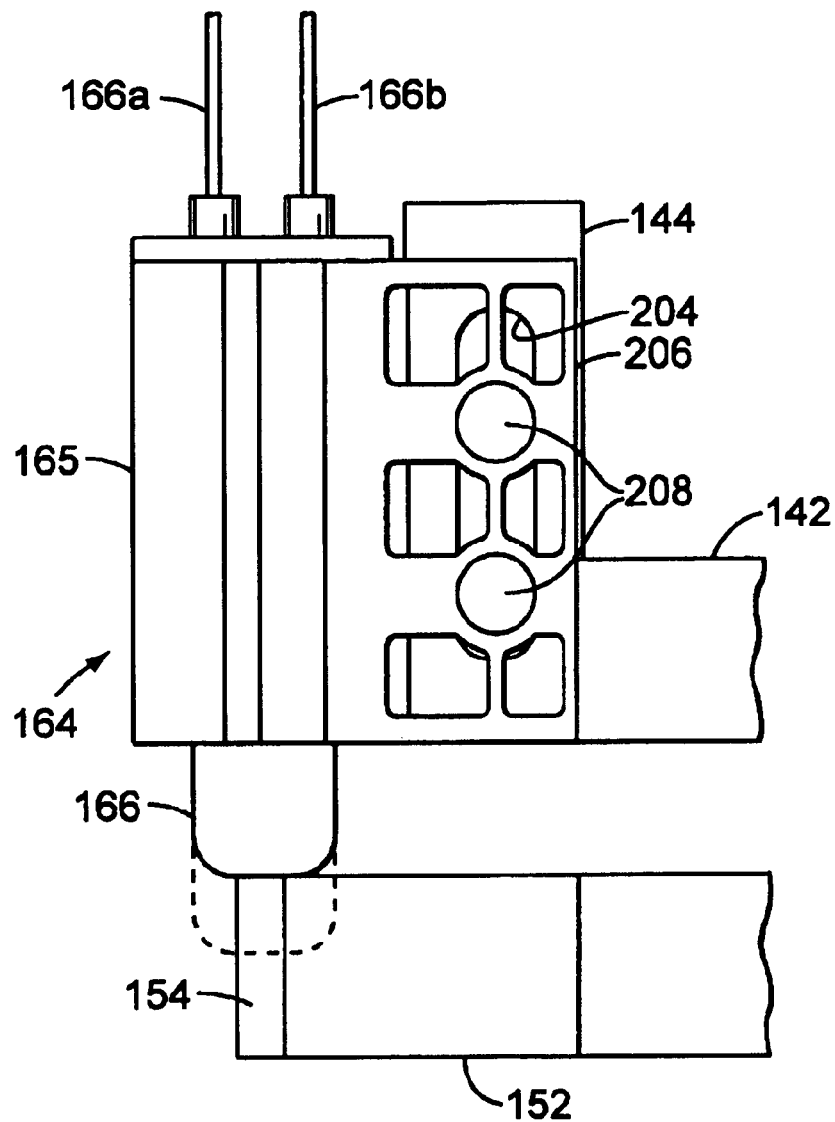
FIG. 4 is an enlarged, fragmentary elevational view taken from FIG. 3.

As illustrated best in FIGS. 4 and 6, the mounting end 144 of the first arm plate 130 is provided with an elongated slot 204. The switch 164 includes a mounting plate 206 that carries two fasteners 208, such as bolts. The mounting plate 206 is clamped against the mounting portion 144 at a selective relative elevation therebetween using the two fasteners 208 positionable within the slot 204. In this way the neutral position that activates or deactivates the switch element 166 can be precisely adjusted.

According to the preferred embodiment the switch 164 is a single pole, single throw, normally open contacts type switch available from Delta Systems, Inc. of Streetsboro, Ohio, U.S.A. Other type switches could be used depending on the application and the vehicle control circuitry configuration.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

The invention claimed is:

1. In a work vehicle having a motor driving a hydrostatic pump, the hydrostatic pump driving a hydraulic motor, wherein the hydrostatic pump comprises an operator-selectable forward drive position and a neutral position, and including an electrical interlock that prevents starting of the motor when the hydrostatic pump is not in the neutral position, the improvement comprising:

the hydrostatic pump having an input control shaft, the rotation of which moves the hydrostatic pump from the neutral position to the forward drive position, a control arm fixed to the input control shaft, a linkage element fixed at one end portion to the control arm at a distance from an axis of rotation of the input control shaft and extending to an opposite end portion where it is engagable to be moved to selectively rotate the input control shaft via said control arm, a first arm mounted for rotation about said input control shaft axis and extending a radial distance from said input control shaft, a neutral start switch mounted to said first arm to orbit about said input control shaft axis with rotation of said control arm, said switch having an actuation portion that is arranged to be actuated to change states when said control arm is in said neutral position.

2. The improvement according to claim 1, wherein said switch actuation portion comprises a push button.

3. The improvement according to claim 1, comprising a second arm arranged to be adjacent said first arm when said control arm is in said neutral position and said actuation portion is depressed by contact with said second arm.

4. The improvement according to claim 1, wherein said switch is mounted to said first arm by a slotted attachment that can be loosened and adjusted to set a position of said switch with respect to said first arm.

5. The improvement according to claim 1, comprising a second arm mounted for rotation about said input control shaft axis and extending a radial distance from said input control shaft axis, and wherein said control arm and said first arm are configured for said control arm to be rotated from a neutral drive position in a first rotary direction to rotate said first arm in said first rotary direction corresponding to one of forward or reverse drive while said second arm is stationary, and said control arm and said second arm are configured for said control arm to be rotated from a neutral drive position in a second rotary direction to rotate said second arm in said second rotary direction corresponding to the respective other of forward or reverse drive while said first arm is stationary, wherein said pressing element is depressed by contact with said second arm when said control arm is in said neutral position.

6. The improvement according to claim 5, comprising a first leg extending from said first arm and a second leg extending from said second arm, and a spring stretched between said first and second legs, said spring rotationally biasing said first arm and said second arm toward each other.

7. The improvement according to claim 6, comprising at least one abutment that is stationary with respect to said pump casing and interposed between said first and second arms, said at least one abutment preventing said first arm from rotating in the second rotational direction past the neutral position, and preventing said second arm from rotating in the first rotational direction past the neutral position.

8. A control arrangement for a hydrostatic transmission pump:

the pump having a casing and an input control shaft, the input control shaft penetrating said casing and rotatable about its axis with respect to the casing, having a neutral position and rotatable about its axis in one direction from neutral to initiate forward drive and in an opposite direction from neutral to initiate reverse drive, the control comprising:

an operator control mechanism movable by the operator to select neutral, forward or reverse drive;

a control arm fixed to said input control shaft for rotation therewith;

a linkage having a base portion connected to said control arm at a position displaced from said axis and a distal position arranged to be displaced by selective movement of the operator control mechanism; and an actuating surface and a neutral start switch that is actuated by being in close proximity with said actuating surface, said actuating surface held stationary with respect to said casing and said neutral start switch mounted to orbit about said axis of said input control shaft with rotation of said control arm, said neutral start switch actuated by said actuating surface to change states when said control arm is rotated into said neutral position, said neutral start switch disengaged from said actuating surface when said control arm is rotated out of said neutral position, wherein said neutral start switch is incorporated into a circuit which prevents starting of said engine when said neutral start switch moves out of close proximity to said actuating surface.

9. The control arrangement according to claim 8, wherein said neutral start switch includes a switch button that changes state when it is depressed by said actuating surface and changes state when it is released from said actuating surface.

10. The control arrangement according to claim 9, comprising a first arm rotationally mounted at a base end thereof for rotation about said input control shaft axis and extending a radial distance from said input control shaft axis, said neutral start switch mounted to a distal end of said first arm;

a second arm rotationally mounted at a base end thereof for rotation about said input control shaft axis and extending a radial distance from said input control shaft axis, said actuating surface provided on said second arm; and wherein said control arm and said first arm are configured for said control arm to be rotated from a neutral drive position in a first rotary direction to rotate said first arm in said first rotary direction corresponding to one of forward or reverse drive while said second arm is stationary, and said control arm and said second arm are configured for said control arm to be rotated from a neutral drive position in a second rotary direction to rotate said second arm in said second rotary direction corresponding to the respective other of forward or reverse drive while said first arm is stationary, wherein said neutral start switch is configured to change the switch state of the neutral start switch when said first and second arms are brought in close proximity, when said control arm is in said neutral position.

11. The control arrangement according to claim 10, wherein said switch is mounted to said first arm by a slotted attachment that can be loosened and adjusted to set a position of said switch with respect to said first arm.

12. The control arrangement according to claim 8, comprising
a first arm mounted for rotation about said input control shaft axis and extending a radial distance from said input control shaft axis, said neutral start switch mounted to a distal end of said first arm;
a second arm mounted for rotation about said input control shaft axis and extending a radial distance from said input control shaft axis said actuating surface provided on said second arm; and
wherein said control arm and said first arm are configured for said control arm to be rotated from a neutral drive position in a first rotary direction to rotate said first arm in said first rotary direction corresponding to one of forward or reverse drive while said second arm is stationary, and said control arm and second arm are configured for said control arm to be rotated from a neutral drive position in a second rotary direction to rotate said second arm in said second rotary direction corresponding to the respective other of forward or reverse drive while said first arm is stationary, wherein said neutral start switch comprises a pressing element that is depressed to change the switch state of the neutral start switch, and said pressing element is depressed by contact with said actuating surface of said second arm when said control arm is in said neutral position.

13. The control arrangement according to claim 12, comprising a first leg extending from said first arm and a second leg extending from said second arm, and a spring stretch between said first and second legs, said spring rotationally biasing said first arm and said second arm toward each other.

14. The control arrangement according to claim 13, comprising at least one abutment that is stationary with respect to said pump casing and interposed between said first and second arms, said at least one abutment preventing said first arm from rotating in the second rotational direction past the neutral position, and preventing said second arm from rotating in the first rotational direction past the neutral position.

* * * * *